(12) United States Patent
Philyaw

(10) Patent No.: US 6,193,218 B1
(45) Date of Patent: Feb. 27, 2001

(54) CABLE PULLING MACHINE

(76) Inventor: Timothy Philyaw, 3317 Maison Ct., Lithonia, GA (US) 30058

( * ) Notice: Subject to any disclaimer, the term of this patent is extended or adjusted under 35 U.S.C. 154(b) by 0 days.

(21) Appl. No.: 09/546,294

(22) Filed: Apr. 10, 2000

(51) Int. Cl.$^7$ .................................................. B66D 1/36
(52) U.S. Cl. ........................ 254/326; 254/213; 254/227; 254/335; 254/361; 254/134.3 FT
(58) Field of Search .................... 254/199, 213, 254/226, 227, 228, 242, 323, 326, 335, 361, 362, 134.3 R, 134.3 FT, 134.5; 405/174

(56) References Cited

U.S. PATENT DOCUMENTS

| | | |
|---|---|---|
| Re. 34,488 | 12/1993 | Clark . |
| 606,391 * | 6/1898 | Rigdon et al. ................... 254/199 |
| 1,673,307 * | 6/1928 | Best ................................. 254/323 |
| 1,887,965 * | 11/1932 | Stoner ............................. 254/323 |
| 2,257,873 * | 10/1941 | Troche ............................ 254/326 |
| 2,436,510 * | 2/1948 | Ferguson ........................ 254/226 |
| 2,655,653 | 10/1953 | Chauvin . |
| 3,825,132 * | 7/1974 | Colangelo ...................... 254/326 |
| 4,454,999 | 6/1984 | Woodruff . |
| 4,469,306 * | 9/1984 | Wimer et al. ............. 254/134.3 FT |
| 4,497,470 | 2/1985 | Carter et al. . |
| 4,695,038 | 9/1987 | Giroux . |
| 4,836,503 | 6/1989 | Giroux . |
| 4,871,127 | 10/1989 | Clark . |
| 5,029,816 | 7/1991 | Langston . |
| 5,653,293 | 8/1997 | Ellis . |
| 6,050,548 * | 4/2000 | Leger ............................... 254/326 |

FOREIGN PATENT DOCUMENTS

| | | | |
|---|---|---|---|
| 354835 * | 5/1905 | (FR) ................................ 254/323 |
| 414532 * | 8/1934 | (GB) ............................... 254/326 |

* cited by examiner

*Primary Examiner*—Donald P. Walsh
*Assistant Examiner*—Emmanuel M. Marcelo
(74) *Attorney, Agent, or Firm*—Hinkle & Associates, PC

(57) ABSTRACT

A cable pulling machine in which all of the operative mechanisms are mounted on a trailer for portability. The machine has an internal combustion engine driving a hydraulic pump supplying fluid pressure to a hydraulic motor on a winch spool which holds a length of line for pulling cable through a conduit. The trailer has, at its distal end, a pair of splayed legs allowing the trailer to be backed over-top of the job site conduit so as to position a boom mounted on the trailer to have the boom free end positioned over the conduit. The boom is adjustable for angle of incidence with respect to the ground for achieving a proper pulling angle. The ends of the splayed legs have adjustable jack rods for leveling the trailer.

9 Claims, 3 Drawing Sheets

CABLE PULLING MACHINE

BACKGROUND OF THE INVENTION

I. Field of the Invention

The present invention relates generally to the field of an improved means for pulling lengths of communication and electrical cable through a buried or underground conduit, especially in sizes that exceed the normal strength of a mechanic's pull and the inertia that comes from an irregular pull.

Typically, cable is pulled through a conduit by using a machine of some sort to pull the wire or cable through the electrical conduit. Inasmuch as cable comes in various sizes, a machine which is built to the standards for pulling a particular size of cable and a machine which is portable, so that the working person may move it from job site to job site, has many advantages. Obviously, portability of the equipment makes for efficiency of time and effort. On long lengths of cable which are to be pulled through a long conduit, it is obviously necessary to have some sort of a machine with mechanical advantage and one which will effect the pull of the cable at a proper angle with respect to the longitudinal axis of the exit end of the conduit.

II. Description of the Related Art

There are many ways to pull cable through conduit. Probably the most basic is to feed a line through the conduit by known means, then tie the line to the free end of the cable to be pulled and subsequently haul on the line, by hand, thereby pulling the cable through the conduit. However, anyone who has tried this particular procedure will know that over a relatively short length of conduit, the friction between the conduit and the cable becomes such that it is nearly physically impossible to effectively pull a cable through any substantial length of conduit.

The prior art knows of more practical machines for pulling cable through conduit. For instance, U.S. Pat. No. 2,655,653 granted to Chauvin discloses a powered cable pulling machine that is mounted on a trailer and is able to pull a cable at a proper angle by adjusting the height of the trailer tongue.

In U.S. Pat. No. 4,497,470 by Carter et al, an electrically powered dolly mounted cable pulling machine is shown, however, this particular machine has limited capabilities for pulling the cable at a correct angle.

The patents to Giroux, namely, U.S. Pat. Nos. 4,695,038 and 4,836,503 disclose trailer mounted cable pulling machines wherein each machine has a plurality of frame mounted, hydraulically driven pinch wheels to achieve speed and torque in pulling long lengths of cable without damaging the cable.

A non-powered cable pulling machine is shown in U.S. Pat. No. 5,653,293 to Ellis and discloses a cable puller that, while portable, requires a prime mover to supply hydraulic power to operate the machine.

SUMMARY OF THE INVENTION

In accordance with the present invention and the contemplated problems which have and continue to exist in this field, the objectives of this invention are to provide a cable pulling machine which is portable and has a hydraulically powered winch for pulling electrical wires and communication type cables through conduits, and further as a winch which can be adapted for other limited uses such as raising or lowering motors or other relatively light construction type equipment.

The present invention also provides a machine for pulling communication type cables which may be readily transported to the job location where the pulling of cable is to be done, and then quickly set to a proper cable angle and anchored in place to pull cable at any normal angle.

The present invention also provides a cable pulling machine that is simple and practical in construction, strong and reliable in use, efficient in operation and is readily moveable to a job site by attaching it to a towing vehicle.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 5 is a side elevation view showing the operational parts of the machine in the stored position.

DESCRIPTION OF THE PREFERRED EMBODIMENT

Figure 1:
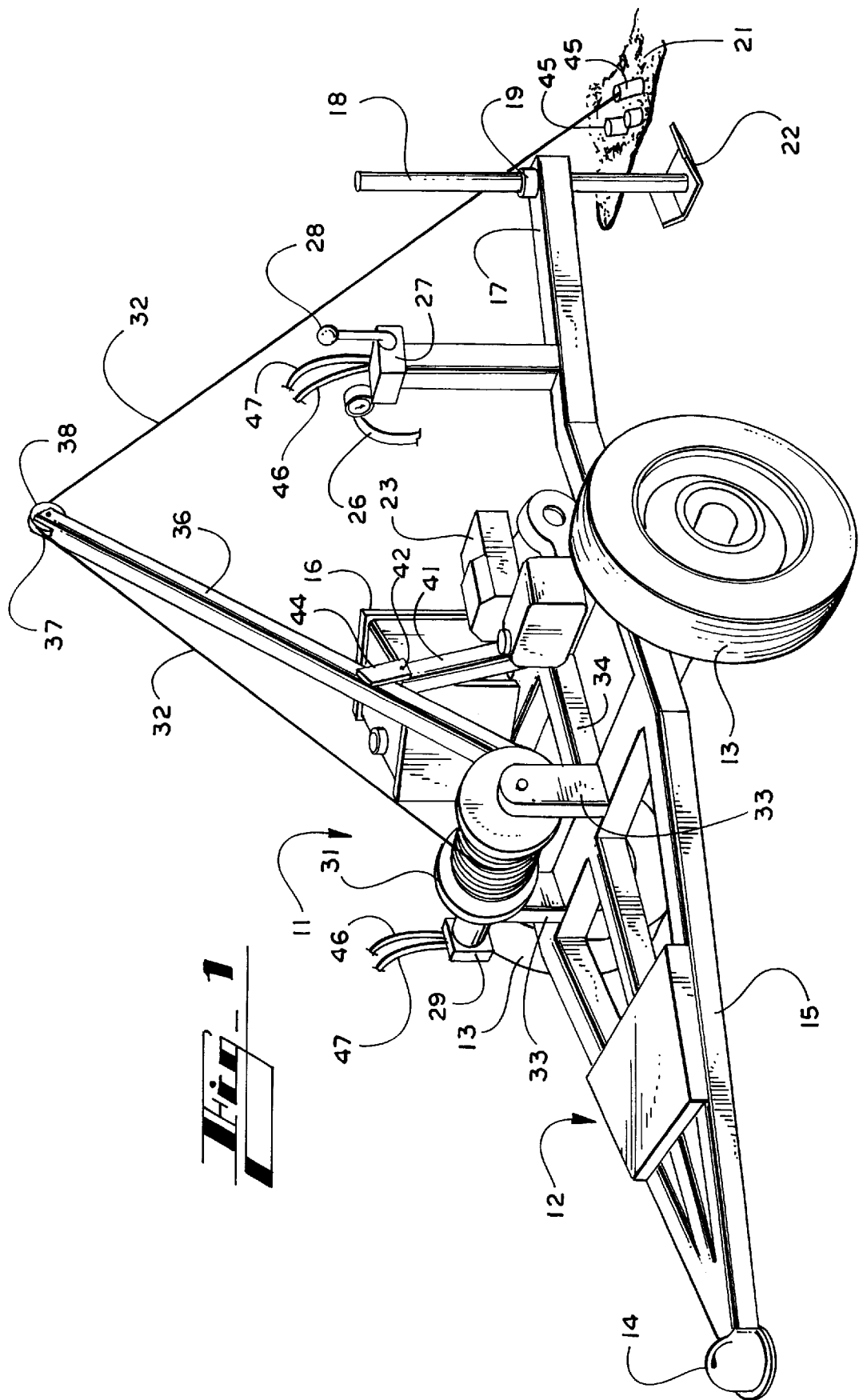
FIG. 1 is an overall perspective view of the cable pulling machine of the present invention.
Figure 2:
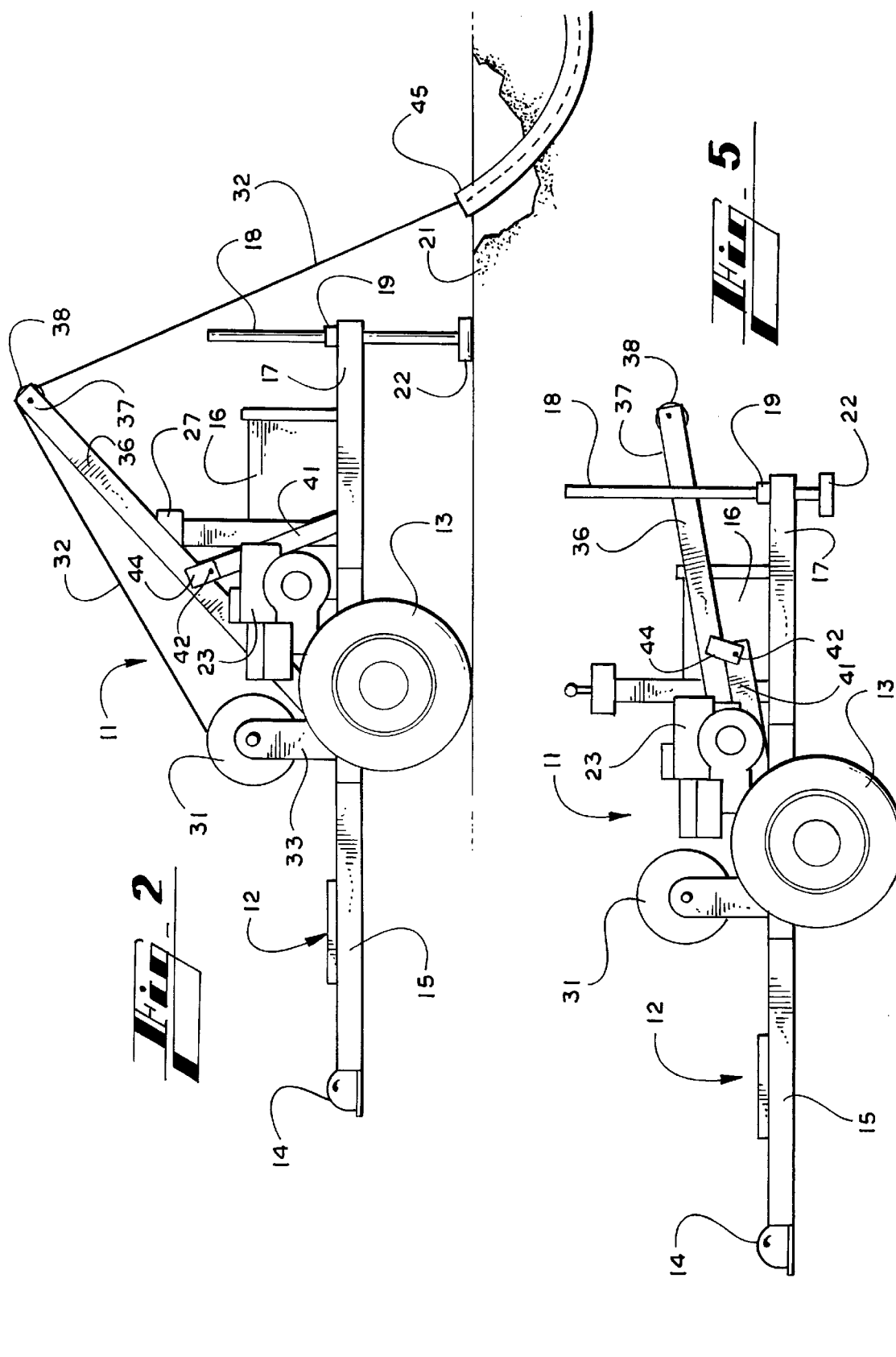
FIG. 2 is a side elevation view of the invention performing a cable pulling operation.
Figure 3:
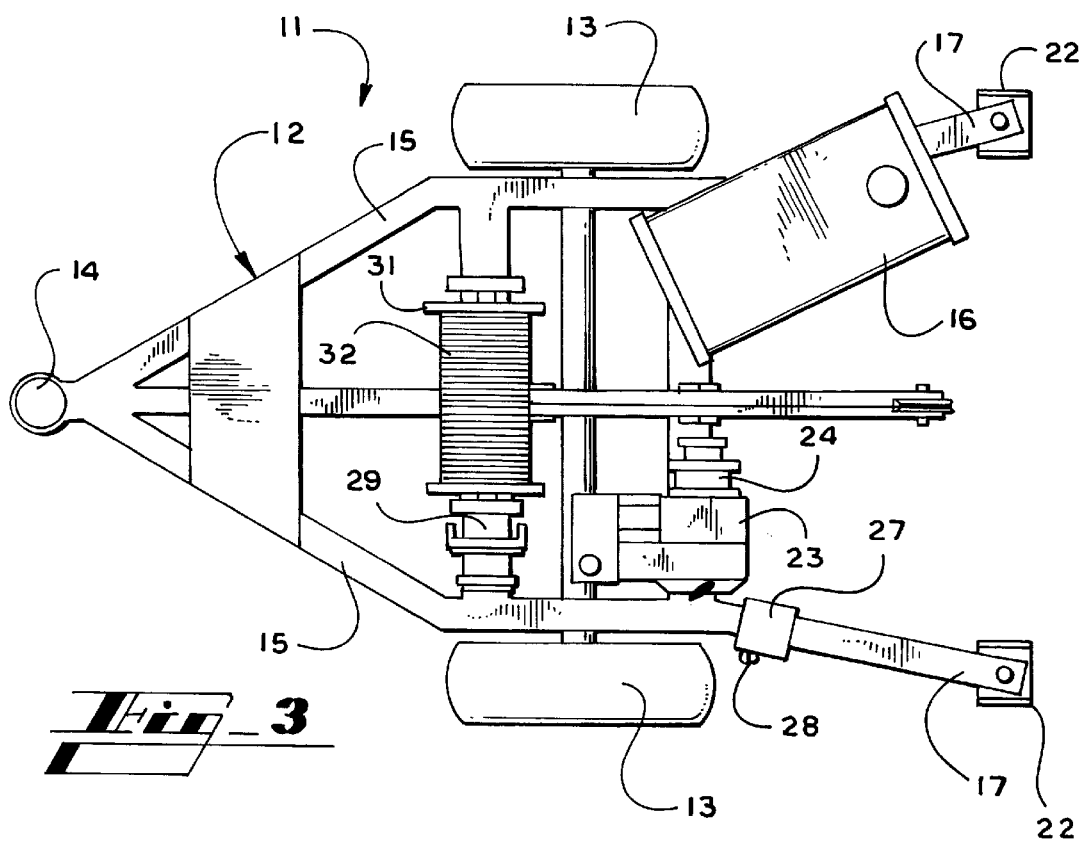
FIG. 3 is a top plan view.
Figure 4:
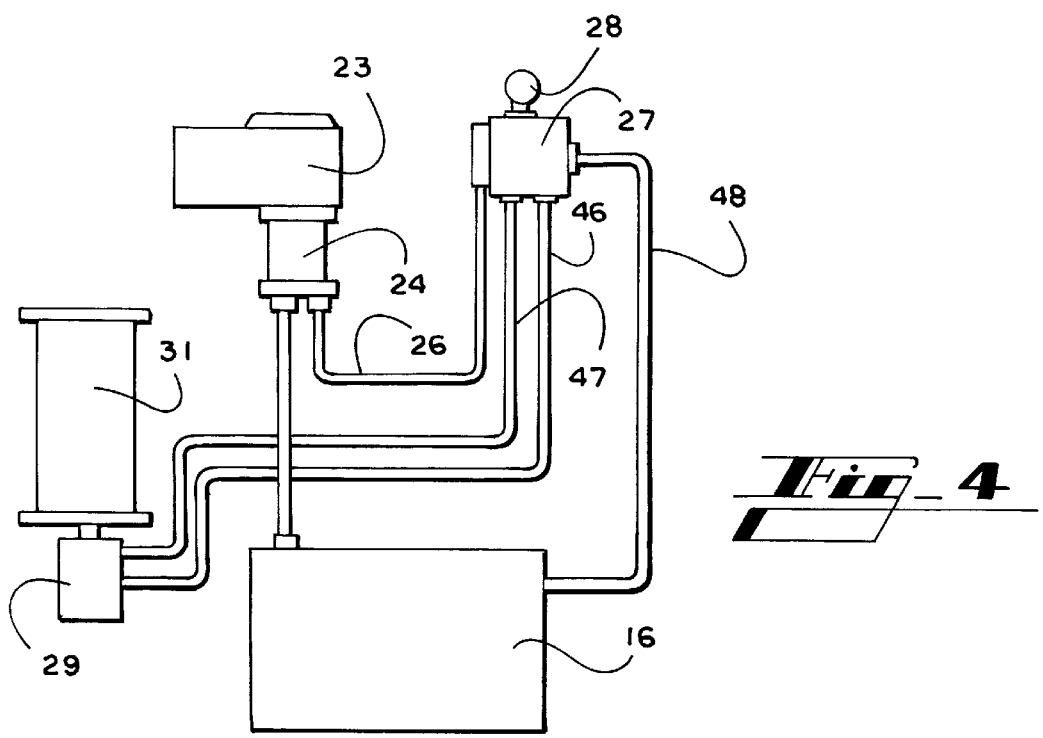
FIG. 4 is a diagrammatic representation of the hydraulic operation system.

For a fuller understanding of the nature and desired objects of this invention, reference should be made to the following detailed description taken in connection with the accompanying drawings. Referring to the drawings wherein like reference numerals designate corresponding parts throughout the several figures, reference is made first to FIG. 1. The cable pulling machine is generally indicated by the numeral 11 and comprises a trailer 12 having suitable wheels 13 connected thereto for allowing the trailer to be transported from job site to job site. Typically, the trailer 12 would be hooked to a prime mover by the trailer hitch coupling 14 attached to the frame 15. Mounted upon the various frame members is a hydraulic fluid storage tank 16 for storing the hydraulic fluid which is utilized to power the various machinery of the machine. At the opposite end of the frame from the coupling 14, the frame splays out into a pair of support legs 17 which have, at the distal end thereof, a jack rod 18 placed within a bushing 19 and thence the jack rod projects to the ground 21 and terminates in a ground engaging plate 22. Inasmuch as there are a pair of support legs 17, there is a corresponding jack rod 18 in each support leg 17 for the purpose of adjusting the trailer to a consistent level condition at any particular job site to take care of the differences of ground elevation as might be near the work area. The splaying of legs 17 will assist the machine operator in positioning the trailer 12 over the job site so that the operative parts of the machine are in a position to properly pull cable. Within the bushing 19, there will be typically a screw engaging pin (not shown) which will be threaded into the bushing 19 and, upon turning sufficient turns within the bushing 19, will engage the shaft of the jack rod 18 thereby preventing the jack rod from any vertical movement within the bushing 19. Each jack rod will be positioned within the respective bushing at the job site so as to engage the ground in a manner to effect a level condition of the trailer 12.

The operational portion of the cable pulling machine includes a gasoline engine 23 mounted to the frame 15 of the trailer, and a hydraulic pump 24 which is coupled to the gasoline engine 23 and is driven thereby to pump hydraulic fluid to the operable parts of the machine 11. When the gasoline engine 23 is started, it drives pump 24 pumping hydraulic fluid from the hydraulic fluid tank 16 through hydraulic line 25, thence through line 26 to the control head 27. The control head 27 is mounted to the frame 15, typically near one of the support legs 17, for ease of use by the machine operator. The control head will generally have a control handle 28 which controls the movement of the hydraulic fluid from pump 24 to the hydraulic winch motor 29. As is seen in the drawings, the winch motor 29 is mounted to a winch spool 31 which houses a long length of pulling line 32. The winch spool 31 is fixed to the frame 15 by means of a pair of winch spool supports 33 which flank the sides of the spool 31.

Coupled to the frame support rail 34, which is mounted as a part of frame 15, is the proximal end 35 of boom 36. The distal end 37 of the boom includes a pulley for the purpose of allowing free running of the pulling line 32 therearound. As can be seen, the boom 36 is typically constructed of a rectangular tubular member and the proximal end is typically mounted for movement within the boom attachment member 39 which is affixed to the support rail 34.

Nearly at the midpoint of the boom 36, is a boom support member 41 hingedly mounted to the pivot fork 44 by a pivot pin 42 which allows free movement of the proximal end of boom support member 41 within fork 44. The distal end 43 of the boom support member terminates upon support rail 34 at various angles of incidence to thereby adjust the angle of the boom 36 with respect to the frame 15 in order that the angle of incidence between the boom and the frame is the desired angle for entry of the pulling line 32 into conduit 45 which exits the ground 21 at the construction site. By positioning boom support 41 along support rail 34, the boom 36 may be easily adjusted by one person to have an angle of incidence which easily replicates the exit angle of the cable and the pulling line from the conduit 45. This allows the machine to pull cable from the conduit at a steady pace and without unduly chaffing or rubbing either the pulling line 32 or the pulled cable attached thereto. As is to be noted, the boom support member 41 is easily adjusted by the operator and, once the cable pulling operation is completed, the operator merely disengages the free end of the boom support from its engagement with the support rail 34 and folds the support member 41 against the underside of the boom 36, at which time the entire boom assembly may be lowered to a stored position such as shown in FIG. 5.

In operation of the present invention, the operator will typically back the trailer to a close proximity of the construction site where the conduit 45 is exiting the ground 21. At this point, the engine 23 will be started and the operator will more control handle 28 to activate motor 29 to rotate the winch spool to unroll the line 32. The pulling line 32 will be fed into the conduit in the standard manner and fed to the other end of the conduit at which time it will be attached to the cable to be pulled. Once this has been accomplished, the operator will typically move the control handle 28 to cause the winch spool to windup line 32. The operator is able to move the control handle 28 to control the direction which is desired for the pulling line to move. If it is desired to unwind the pulling line from the winch spool 31, the operator would then move the control handle in the direction which may, for simplicity sake, be defined as a "forward" movement to thereby turn the winch motor in the desired direction. By moving the control handle 28 in a direction to move the winch motor 29 to unwind the pulling line from the wind spool 31, hydraulic fluid will be forced through hydraulic control line 46 to the winch motor 29. If is desired that the pulling line 32 be retracted and wound upon the winch spool 31, the operator would move the control handle 28 into the "reverse" position and force hydraulic fluid through hydraulic line 47 to the winch motor 29, thereby changing the direction of movement of winch spool 31 to wind the pulling line thereon. In typical fashion, excess hydraulic fluid is returned to tank 16 through an overflow line 48.

As is evident, the above description shows that the cable pulling machine of the present invention is quite easy to operate by one operator, is extremely portable and is very convenient to set up at a construction site to effectively pull cable from conduit at the required angle of exit from the conduit.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A portable cable pulling machine comprising a wheeled frame, the frame having mounted thereon an integral combustion engine, a hydraulic pump coupled to the engine, a hydraulic fluid reservoir tank, a winch spool coupled to a hydraulic motor and an adjustable boom, the frame having a proximal end and a distal end, and supporting structure therebetween, the proximal end of the frame terminating in a trailer hitch coupling, the distal end of the frame terminating in a pair of splayed frame ends, a control mechanism to selectively energize the winch spool at predetermined times by hydraulic fluid action delivered to the hydraulic motor.

2. A portable cable pulling machine as claimed in claim 1, wherein each frame end has an aperture therethrough, each aperture having an elongated jack rod therein capable of reciprocal movement in the aperture for ground engaging contact.

3. A portable cable pulling machine as claimed in claim 2, wherein each jack rod has an end terminating in a ground engaging plate.

4. A portable cable pulling machine as claimed in claim 2, wherein each jack rod has a locking mechanism to maintain the jack rod in a predetermined location with respect to the aperture.

5. A portable cable pulling machine as claimed in claim 2, wherein each jack rod has a end terminating in a ground engaging plate and further having a locking mechanism to maintain the jack rod in a predetermined location with respect to the aperture.

6. A portable cable pulling machine as claimed in claim 5, wherein the adjustable boom has an elongated length, the boom further having a proximal end and a distal end, the proximal end of the boom being pivotally connected to the supporting structure of the frame, the distal end of the boom terminating in a freely rotatable pulley.

7. A portable cable pulling machine as claimed in claim 6, further comprising an adjustable boom support pivotally connected at a first end to the length of the boom between the proximal end and the distal end of the boom, a second end of the support being freely adjustably and selectively placed on the frame supporting structure.

8. A portable cable pulling machine as claimed in claim 7, wherein the winch spool is positioned on the frame supporting structure adjacent to the proximal end of the boom.

9. A portable cable pulling machine comprising a wheeled frame, the frame having mounted thereon an integral combustion engine, a hydraulic pump coupled to the engine, a hydraulic fluid reservoir tank, a winch spool coupled to a hydraulic motor and an adjustable boom, the frame having a proximal end and a distal end, and supporting structure therebetween, the proximal end of the frame terminating in a trailer hitch coupling, the distal end of the frame terminating in a pair of splayed frame ends, a control mechanism to selectively energize the winch spool at predetermined times by hydraulic fluid action delivered to the hydraulic motor, each frame end having an aperture therethrough, each aperture having an elongated jack rod therein capable of reciprocal movement in the aperture for ground engaging contact, each jack rod having a end terminating in a ground engaging plate and further having a locking mechanism to maintain the jack rod in a predetermined location with respect to the aperture, the adjustable boom having an elongated length, the boom further having a proximal end and a distal end, the proximal end of the boom being pivotally connected to the supporting structure of the frame, the distal end of the boom terminating in a freely rotatable pulley, an adjustable boom support pivotally connected at a first end to the length of the boom between the proximal end and the distal end of the boom, a second end of the support being freely adjustably and selectively placed on the frame supporting structure.

* * * * *